US010346997B2

(12) United States Patent
Jin et al.

(10) Patent No.: US 10,346,997 B2
(45) Date of Patent: Jul. 9, 2019

(54) DEPTH ESTIMATION METHOD BASED ON LIGHT-FIELD DATA DISTRIBUTION

(71) Applicant: Graduate School at Shenzhen, Tsinghua University, Shenzhen, Guangdong (CN)

(72) Inventors: Xin Jin, Guangdong (CN); Yatong Xu, Guangdong (CN); Qionghai Dai, Guangdong (CN)

(73) Assignee: GRADUATE SCHOOL AT SHENZHEN, TSINGHUA UNIVERSITY, Shenzhen, Guangdong (CN)

(*) Notice: Subject to any disclaimer, the term of this patent is extended or adjusted under 35 U.S.C. 154(b) by 83 days.

(21) Appl. No.: 15/809,769

(22) Filed: Nov. 10, 2017

(65) Prior Publication Data

US 2018/0114328 A1 Apr. 26, 2018

Related U.S. Application Data

(63) Continuation of application No. PCT/CN2015/098117, filed on Dec. 21, 2015.

(30) Foreign Application Priority Data

May 15, 2015 (CN) .......................... 2015 1 0251234

(51) Int. Cl.
*G06T 7/557* (2017.01)
*G06T 7/571* (2017.01)
(Continued)

(52) U.S. Cl.
CPC ............ *G06T 7/557* (2017.01); *G06T 1/0007* (2013.01); *G06T 7/571* (2017.01); *H04N 5/225* (2013.01);
(Continued)

(58) Field of Classification Search
CPC ....... G06T 7/557; G06T 7/571; G06T 1/0007; H04N 5/2226; H04N 5/225; H04N 5/2254
See application file for complete search history.

(56) References Cited

U.S. PATENT DOCUMENTS 9,025,895 B2   5/2015 Venkataraman et al.
9,524,556 B2 * 12/2016 Uliyar .................. H04N 13/232
(Continued)

FOREIGN PATENT DOCUMENTS

CN   102314683 A    1/2012
CN   102809918 A   12/2012
(Continued)

OTHER PUBLICATIONS

Yang et al., "Depth Estimation from Light Field Nnalysis Based Multiple Cues Fusion", Chinese Journal of Computers, online publishing No. 97, vol. 37, 2014, pp. 1-15 provided.
(Continued)

*Primary Examiner* — David F Dunphy
(74) *Attorney, Agent, or Firm* — Hamre, Schumann, Mueller & Larson, P.C.

(57) ABSTRACT

A depth estimation method based on light-field data distribution includes the following steps: S1. adjusting pixel distribution of input light-field images to generate a series of refocused light-field images having different focal lengths; S2. for a spatial point, corresponding to a macro-pixel, extracting intensity ranges for the macro-pixel from the refocused light-field images, and then selecting one refocused light-field image corresponding to a minimum intensity range, the focal length of the selected refocused light-field image being taken as a scene depth of the macro-pixel; the macro-pixel corresponding to one point in an actual scene, the intensity range of the macro-pixel being a variation range of intensity values of all points within the
(Continued)

macro-pixel; and repeating the step S2 to obtain scene depths of all macro-pixels.

7 Claims, 1 Drawing Sheet

(51) Int. Cl.
    *H04N 5/225*     (2006.01)
    *G06T 1/00*     (2006.01)
    *H04N 5/222*     (2006.01)

(52) U.S. Cl.
    CPC ......... *H04N 5/2226* (2013.01); *H04N 5/2254* (2013.01); *G06T 2207/10028* (2013.01); *G06T 2207/10052* (2013.01)

(56) References Cited

U.S. PATENT DOCUMENTS

| | | | |
|---|---|---|---|
| 2014/0263963 A1* | 9/2014 | Broxton | G02B 21/367 250/208.1 |
| 2015/0003752 A1 | 1/2015 | Venkataraman et al. | |

FOREIGN PATENT DOCUMENTS

| | | |
|---|---|---|
| CN | 104050662 A | 9/2014 |
| CN | 104079827 A | 10/2014 |
| CN | 104463949 A | 3/2015 |
| CN | 104899870 A | 9/2015 |

OTHER PUBLICATIONS

Perwass et al., "Single Lens 3D-Camera with Extended Depth-of-Field", Human Vision and Electronic Imaging XVII, vol. 8291 829108-2, Feb. 9, 2012, Raytrix GmbH, www.raytrix.de, 15 pages provided.
Soukup et al., "Depth Estimation within a Multi-Line-Scan Light-Field Framework", International Symposium on Visual Computing, ISVC 2014, pp. 471-481 provided.
Frese et al., "Robust Depth Estimation by Fusion of Stereo and Focus Series Acquired with a Camera Array", Multisensor Fusion and Integration for Intelligent Systems, Sep. 3-6, 2006, pp. 243-248 pages.
International Search Report (English and Chinese) and Written Opinion of PCT/CN2015/098117 dated Mar. 17, 2016.
Office Action issued in CN201510251234.8 dated Apr. 6, 2017, with English translation, 8 pages.

* cited by examiner

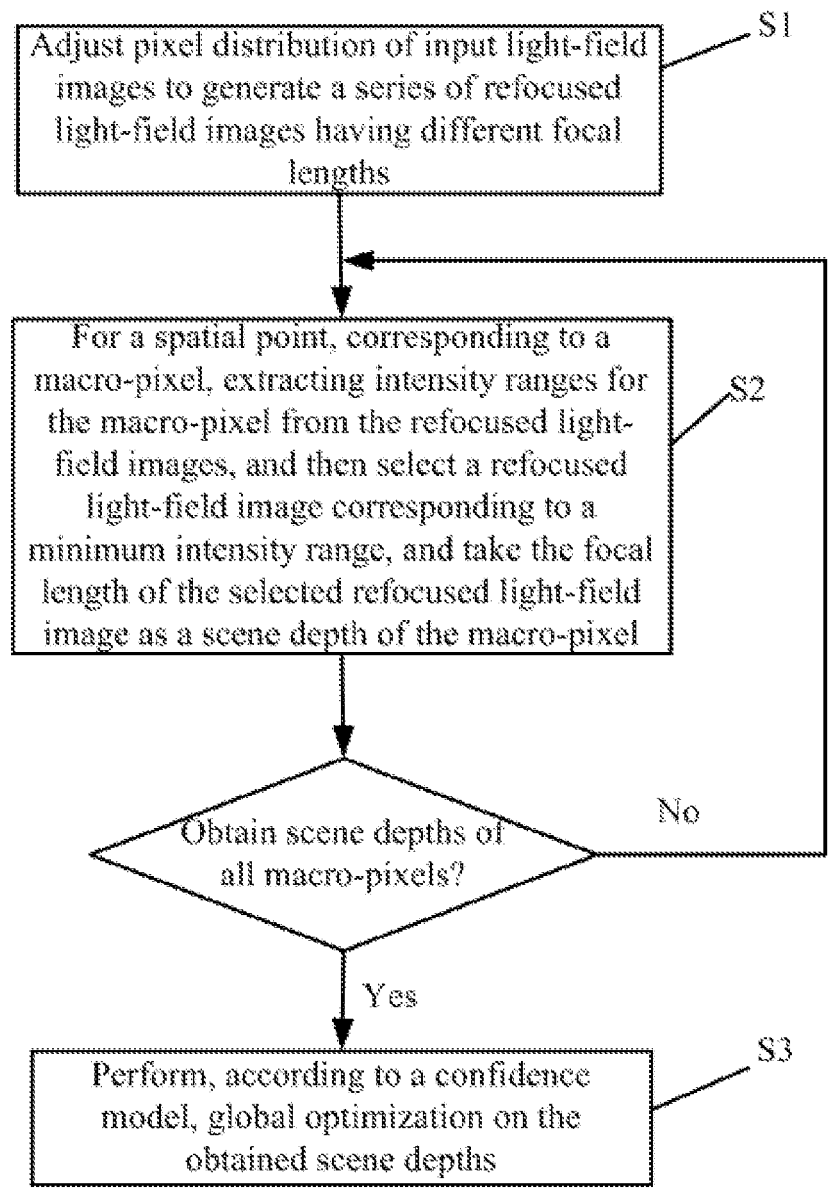

DEPTH ESTIMATION METHOD BASED ON LIGHT-FIELD DATA DISTRIBUTION

CROSS REFERENCE TO RELATED APPLICATIONS

This application is a continuation application of PCT/CN2015/098117, filed on Dec. 21, 2015. The contents of PCT/CN2015/098117 are all hereby incorporated by reference.

FIELD OF THE INVENTION

The present application relates to the field of computer vision and digital image processing, and particularly to a depth estimation method based on light-field data distribution.

RELATED ARTS

Based on a light-field imaging theory, a light-field camera released recently (such as Lytro and RayTrix) achieves a great commercial success, and causes extensive attention of research academia. A normal user can use one single camera to estimate a scene depth from a shot light-field image by means of related algorithms in addition to realizing functions of refocusing and movement of a viewpoint. The method for calculating the depth has advantages of low price, convenience and the like.

Existing depth estimation methods based on a light-field camera are substantially divided into two categories: stereo matching algorithms and light-field analysis algorithms. The conventional stereo matching algorithms directly use a correlation between various sub-aperture images acquired by a light-field camera to calculate the depth. However, such algorithms usually have relatively high calculation complexity, and obtain low quality depth since the low resolution of sub-aperture images cannot satisfy accuracy requirements needed by matching. Some other improved stereo matching algorithms, for example, consider linearity of light ray propagation but still restrict the performance of depth estimation because of only using correlation information of various viewpoint images in light-field data.

Light-field analysis methods attempt to simultaneously use two cues, i.e., consistency and focal length information of various viewpoint images contained in light-field data, to estimate the depth. Such algorithms define different cost equations for different cues, and fuse depth estimations obtained by the two cues to perform complementation to improve the accuracy of a final result. However, the depth estimated by such algorithms lacks details, and still remains to be improved in accuracy and consistency.

SUMMARY OF THE INVENTION

The present application provides a depth estimation method based on light-field data distribution, to solve at least one of the above technical problems in existing depth estimation methods with a light-field camera.

The idea of the present application is to fully refer to characteristics of light-field data, and extract a tensor related to a focal length from a series of refocused light-field images obtained by changing pixel distribution of input light-field images to estimate a scene depth. Further, the present application also uses a variation trend of this tensor with the depth and gradient information of the central sub-aperture texture image to establish a multivariate confidence model to measure the confidence of the initial depth quality of each point, and makes good for deficiency, thereby optimizing the initial estimation result, and achieving an optimized high-quality depth image by using a light-field camera acquired data.

The depth estimation method based on light-field data distribution provided by the present application includes the following steps:

S1. adjusting pixel distribution of input light-field images to generate a series of refocused light-field images having different focal lengths;

S2. for a spatial point, corresponding to a macro-pixel, extracting intensity ranges for the macro-pixel from the refocused light-field images, and then selecting one refocused light-field image corresponding to a minimum intensity range, the focal length of the selected refocused light-field image being taken as a scene depth of the macro-pixel, the macro-pixel corresponding to one point in an actual scene, and the intensity range of the macro-pixel being a variation range of intensity values of all points within the macro-pixel; and repeating the step S2 to obtain scene depths of all macro-pixels.

In the above depth estimation method based on light-field data distribution, preferably, in the step S1, a point spread function is adopted to adjust the pixel distribution of input light-field images.

The above depth estimation method based on light-field data distribution preferably further includes a step S3 of performing, according to a confidence model, global optimization on the scene depths obtained in the step S2.

In the above depth estimation method based on light-field data distribution, preferably, the step S3 of performing, according to the confidence model, the global optimization on the scene depths obtained in the step S2 includes: by taking the scene depth obtained in the step S2 as an initial input, using a Markov random field to perform optimization, and a specific optimization method includes: evaluating the depth of each point according to the confidence model, using a depth estimation having high accuracy to amend an inaccurate depth, improving the consistence of the depth estimation in homogeneous regions, and reserving a depth boundary.

In the above depth estimation method based on light-field data distribution, preferably, the confidence model is a multivariate confidence model, and the multivariate confidence model includes a first portion for measuring accuracy of the scene depths, and a second portion for measuring consistency of the scene depths at non-boundary regions and mutability at boundary regions.

In the depth estimation method based on light-field data distribution described above, preferably, the first portion of the multivariate confidence model is C1(x, y), $$C_1(x,y) = \sqrt{(R_{z^*}(x,y) - R_{z'}(x,y))^2 + (z^* - z')^2}$$

wherein $R_{z^*}(x, y)$ and $R_{z'}(x, y)$ are a minimum value point and a minimal value point of a changing curve of an intensity range $R_z(x, y)$ with a scene depth respectively, and $z^*$ and $z'$ are scene depths corresponding to the minimum value point and the minimal value point respectively.

In the above depth estimation method based on light-field data distribution, preferably, the second portion of the multivariate confidence model is based on the gradient information of central sub-aperture texture images; the depth estimation method further includes a step of acquiring central sub-aperture texture images of the series of refocused light-field images respectively, and a step of using the acquired central sub-aperture texture images to calculate the credibility by the second portion of the multivariate confidence model.

The embodiments extract a tensor related to a focal length from a series of refocused light-field images obtained by converting pixel distribution of input light-field images to estimate a scene depth. Preferably, the embodiments use a variation trend of this tensor with the depth and gradient information of sub-aperture texture images at the center of the scene to define a multivariate confidence model and measure accuracy and consistence of an initial depth to further optimize the depth estimation. The use of the method of the embodiments may fully achieve scene depth estimation having abundant details, clear features and high accuracy and consistence by means of scene texture and space information acquired by a light-field camera like Lytro.

BRIEF DESCRIPTION OF THE DRAWINGS

FIGURE is a flowchart of some embodiments of a depth estimation method based on light-field data distribution according to the present application.

DETAILED DESCRIPTION OF THE INVENTION

The present application will be further described with reference to the accompanying drawing and embodiments. These more detailed descriptions are intended to aid in understanding the present application, but should not be used to limit the present application. According to the disclosure of the present application, it is obvious for a person skilled in the art that the present application can be implemented without some or all of these specific details. However, in other cases, well-known operation processes are not described in detail in order to avoid weakening application and creation.

Referring to FIGURE, a depth estimation method based on light-field data distribution according to some embodiments includes the following steps:

S1. Adjusting pixel distribution of input light-field images to generate a series of refocused light-field images having different focal lengths.

Specifically, an input light-field image is firstly subjected to precorrection processing to remove peripheral points in each macro-pixel, that cannot capture effective data information, preventing that insignificant pixel values disturb subsequent processing. A PSF (Point Spread Function) is adopted to adjust pixel location distribution of a corrected light-field image $L_o$, so as to realize refocusing processing on the input light-field images as follows:

$$L_z(x, y, u, v) = L_o\left(x + u\left(1 - \frac{1}{z}\right), y + v\left(1 - \frac{1}{z}\right), u, v\right) \quad (1)$$

thereby generating a series of light-field images $L_z(z=1, 2, 3 \ldots)$ of which focusing planes change from the near to the distant, wherein z is a preset depth level, and x, y and u, v are a space coordinate and an angular coordinate on an image plane respectively.

S2. For a spatial point, corresponding to a macro-pixel, extracting intensity ranges for the macro-pixel from the refocused light-field images, and then selecting one refocused light-field image corresponding to a minimum intensity range, the focal length of the selected refocused light-field image being taken as a scene depth of the macro-pixel. The macro-pixel corresponds to one point in an actual scene, and the intensity range of the macro-pixel is a variation range of intensity values of all points within the macro-pixel.

Each microlens of a microlens array of a light-field camera represents a sub-aperture at a certain angle with respect to a main lens of the camera, a macro-pixel in light-field data corresponds to one point in the actual scene, the macro-pixel contains angular information of projection of its corresponding scene point passing through the entire microlens array, and is correspondingly recorded on each point within the macro-pixel, i.e., an intensity value and a distribution position of each point. According to a light-field imaging theory, intensity of each point in a macro-pixel of an image reflects projection of a scene point through microlenses at different positions, and when focusing planes of a series of light-field images $L_z(z=1, 2, 3 \ldots)$ change from the near to the distant, a intensity value of each point in the macro-pixel continually changes, resulting in that an intensity range of the entire macro-pixel also changes with it. Therefore, the depth is estimated by taking the intensity range of the macro-pixel as a tensor related to the depth. Specifically, the intensity range of the macro-pixel is extracted as follows:

$$R_z(x, y) = I_{\max_{u,v}}(x, y, u, v) - I_{\min_{u,v}}(x, y, u, v), u, v \in M \quad (2)$$

wherein I(x, y, u, v) is an intensity value of one point (u, v) within a microlens (corresponding to a macro-pixel (x, y) in an image plane $L_z$) located at a coordinate (x, y), and M represents a set of all points with the microlens.

It can be known from the analysis of the light-field imaging theory that when a scene point is located just right on the focusing plane of the camera, this point is accurately projected on the image plane through the sub-aperture located at each angle, i.e., the projection of each angle accurately reflects a texture value of this point, and thus, a change range of intensity of each point within its corresponding macro-pixel is minimum (the intensity range of the macro-pixel is minimum). The focal length of the light-field image $L_z$ focusing this scene point reflects depth information of this point, thereby obtaining a scene depth initial estimation $D_{initial}(x, y)$ of the macro-pixel (x, y), $$D_{initial}(x, y) = \arg\min_z R_z(x, y) \quad (3)$$

The step S2 is repeated to obtain scene depths of all macro-pixels.

S3. Performing, according to a confidence model, global optimization on the scene depths obtained in the step S2.

Preferably, the multivariate confidence model includes a first portion for measuring accuracy of the scene depths, and a second portion for measuring consistency of the scene depths at non-boundary regions and mutability at boundary regions.

Preferably, the multivariate confidence model is established as follows: firstly, unary credibility (i.e., the first portion of the multivariate confidence model) is defined to measure the accuracy of the depth estimations. It is found, by analyzing and extracting a variation trend (changing curve) of an intensity range $R_z(x, y)$ of each point with a depth D, that there is positive correlation between an Euclidean distance between a minimum value point and a minimal value point of the curve and the accuracy of the depth estimation $D_{initial}(x, y)$ of this point, thereby giving the depth estimation of each point credibility $C_1$ corresponding to the accuracy as follows:

$$C_1(x,y) = \sqrt{(R_{z*}(x,y) - R_{z'}(x,y))^2 + (z^* - z')^2} \quad (4)$$

wherein $R_{z*}(x, y)$ and $R_{z'}(x, y)$ are a minimum value point and a minimal value point of the changing curve of the intensity range $R_z(x, y)$ with the depth D respectively, and $z^*$ and $z'$ are their respectively corresponding depths. Secondly, other unary credibility (i.e., the second portion of the multivariate confidence model) is defined to measure the consistency of the estimation depth $D_{initial}(x, y)$ at non-boundary regions and the mutability at boundary regions. According to a characteristic that gradient information of central sub-aperture texture images changes gently in the non-boundary regions and mutates in the boundary regions, the other unary credibility $C_2$ is defined as follows:

$$C_2(x, y) = (Grad_x(x, y) + Grad_y(x, y))/2 \quad (5)$$

$$Grad_x(x, y) = \begin{cases} |F(x+1, y) - F(x, y)|, & x = 1 \\ |F(x+1, y) - F(x-1, y)|/2, & x \in (1, M) \\ |F(x, y) - F(x-1, y)|, & x = M \end{cases} \quad (7)$$

$$Grad_y(x, y) = \begin{cases} |F(x, y+1) - F(x, y)|, & y = 1 \\ |F(x, y+1) - F(x, y-1)|/2, & y \in (1, N) \\ |F(x, y) - F(x, y-1)|, & y = N \end{cases}$$

wherein $Grad_x$ and $Grad_y$ are gradient values in x, y directions of the image plane respectively, and $F(x, y)$ is an intensity value of a pixel at a central sub-aperture texture image $(x, y)$. Finally, the credibility $C_1$ and the credibility $C_2$ are combined to establish a multivariate confidence model C as follows:

$$C(x,y) = C_1(x,y) \cdot C_2(x,y) \quad (6)$$

In the embodiments described above, the second portion of the multivariate confidence model is based on the gradient information of the central sub-aperture texture images. Correspondingly, the depth estimation method further includes a step of acquiring a central sub-aperture texture image of the series of refocused light-field images respectively, and a step of using the acquired central sub-aperture texture image to calculate the credibility by the second portion of the multivariate confidence model. Specifically, since each point within a macro-pixel records angular information, an image composed of central points of respective macro-pixels is a central sub-aperture texture image.

In some embodiments, the steps of the global optimization include: by taking the scene depth $D_{initial}$ obtained in the step S2 as an initial input, using an MRF (Markov random field) to perform optimization. The principle of the optimization is: increasing the accuracy and the consistence of the depth estimation, and reserving clear boundary characteristics. A specific optimization method includes: evaluating the depth of each point according to the confidence model, using a depth estimation having high accuracy to amend an inaccurate depth, improving the consistence of the depth estimation in homogeneous regions, and reserving a depth boundary. A final depth estimation $D_{final}$ is obtained after the global optimization, and the process is as follows:

$$\underset{D_{final}}{\text{minimize}} \sum_{(x,y)} C \cdot |D_{final} - D_{initial}| + \quad (8)$$
$$\lambda_{flat} \sum_{(x,y)} \left( \left|\frac{\partial D_{final}}{\partial x}\right|_{(x,y)} + \left|\frac{\partial D_{final}}{\partial y}\right|_{(x,y)} \right) + \lambda_{smooth} \sum_{(x,y)} |(\Delta D_{final})|_{(x,y)}$$

wherein $\lambda_{flat}$ and $\lambda_{smooth}$ are parameters of a Laplace bound term and a second-order differential term, and restrict smoothness and continuity of the final depth estimation $D_{final}$ respectively. In addition, it is also possible to calculate an error between the $D_{final}$ and the bound term to constitute an error matrix to minimize the equation (8), thereby further optimizing the result of the depth estimation. It will be understood that using the Markov random field to perform the global optimization is just a preferred way, and the present application can also adopt other ways to perform the global optimization, for example, multi-label optimization based on image cutting, joint discrete-continuous optimization, and the like.

Some above embodiments fully refer to characteristics of light-field data, extract a tensor related to a focal length from a series of refocused light-field images obtained by converting pixel distribution of input light-field images to estimate a scene depth, and use a variation trend of this tensor with the depth and gradient information of sub-aperture texture images at the center of the scene to define a multivariate confidence model and measure accuracy and consistence of an initial depth to further optimize the depth estimation. The use of some embodiments may fully achieve indoor and outdoor scene depth estimation having abundant details, clear features and high accuracy and consistence by means of scene texture and space information acquired by a light-field camera like Lytro.

What is claimed is:

1. A depth estimation method based on light-field data distribution, comprising the following steps:
    S1. adjusting pixel distribution of input light-field images to generate a series of refocused light-field images having different focal lengths;
    S2. for a spatial point, corresponding to a macro-pixel, extracting intensity ranges for the macro-pixel from the refocused light-field images, and then selecting one refocused light-field image corresponding to a minimum intensity range, the focal length of the selected refocused light-field image being taken as a scene depth of the macro-pixel, the macro-pixel corresponding to one point in an actual scene, and the intensity range of the macro-pixel being a variation range of intensity values of all points within the macro-pixel; and
    repeating the step S2 to obtain scene depths of all macro-pixels.

2. The depth estimation method based on light-field data distribution according to claim 1, wherein in the step S1, a point spread function is adopted to adjust the pixel distribution of input light-field images.

3. The depth estimation method based on light-field data distribution according to claim 1, further comprising a step S3 of performing, according to a confidence model, global optimization on the scene depths obtained in the step S2.

4. The depth estimation method based on light-field data distribution according to claim 3, wherein the step S3 of performing, according to the confidence model, the global optimization on the scene depth obtained in the step S2 comprises: by taking the scene depth obtained in the step S2 as an initial input, using a Markov random field to perform optimization, and a specific optimization method comprises: evaluating the depth of each point according to the confidence model, using a depth estimation having high accuracy to amend an inaccurate depth, improving the consistence of the depth estimation in homogeneous regions, and reserving a depth boundary.

5. The depth estimation method based on light-field data distribution according to claim 3, wherein the confidence model is a multivariate confidence model, and the multivariate confidence model comprises a first portion for measuring accuracy of the scene depths, and a second portion for measuring consistency of the scene depths at non-boundary regions and mutability at boundary regions.

6. The depth estimation method based on light-field data distribution according to claim 5, wherein
the first portion of the multivariate confidence model is $C1(x, y)$, $$C_1(x,y) = \sqrt{(R_{z*}(x,y) - R_{z'}(x,y))^2 + (z^* - z')^2}$$

wherein $R_{z*}(x, y)$ and $R_{z'}(x, y)$ are a minimum value point and a minimal value point of a changing curve of an intensity range $R_z(x, y)$ with a scene depth respectively, and $z^*$ and $z'$ are scene depths corresponding to the minimum value point and the minimal value point respectively.

7. The depth estimation method based on light-field data distribution according to claim 5, wherein
the second portion of the multivariate confidence model is based on gradient information of central sub-aperture texture images;
the depth estimation method further comprises a step of acquiring central sub-aperture texture images of the series of refocused light-field images respectively, and a step of using the acquired central sub-aperture texture images to calculate the credibility by the second portion of the multivariate confidence model.

* * * * *